Patented Apr. 12, 1949

2,466,960

UNITED STATES PATENT OFFICE 2,466,960

VAT DYESTUFF

Eduard Mörgeli, Neue Welt, near Basel, and Walter Kern, Sissach, Switzerland, assignors to Ciba Limited, Basel, Switzerland, a Swiss firm No Drawing. Application March 9, 1945, Serial No. 581,968. In Switzerland December 28, 1943

Section 1, Public Law 690, August 8, 1946
Patent expires December 28, 1963

1 Claim. (Cl. 260—276)

Anthraquinone acridones are a well known class of compounds, and in particular 4-benzoylamino anthraquinone 2,1-(N)-benzacridone is an old dyestuff. It is defective, however, in some fastness properties and therefore scarcely used nowadays. Further research has been devoted to this class of dyestuffs, and it is interesting to see that all experts have been convinced that an improvement should be brought about by suitably substituting the benzene radical fused on to the acridone ring. Numerous proposals to this end have been made. The trouble is, however, that by such substitutions the shade is normally displaced towards the violet side, and this is unfavourable, because blue to greenish blue dyestuffs are somewhat rare in the anthraquinone series.

It is an object of the present invention to show that very valuable results can be obtained by effecting comparatively small changes not in the benzene radical fused on to the acridone ring, but in the acyl radical attached to the amino group in 4-position. Further objects will appear as the specification proceeds.

It has been found that valuable vat dyestuffs are obtained by acylation of 4-aminoanthraquinone-2:1-(N)-benzacridones which are free from trifluormethyl groups in the benzene ring attached to the acridone ring, by using as acylating agents aromatic unsaturated acids or their functional derivatives, and, if necessary, introducing further substituents into the acid radical.

The 4-aminoanthraquinone-2:1-(N)-benzacridones serving as starting materials for the present process in which the bz-nucleus must be free from trifluormethyl groups, can for example be altogether free from substituents in the bz-nucleus. According to the present process there are used for the acylation of such compounds unsaturated aromatic acids or their functional derivatives, preferably acid halides. Among unsaturated acids are included especially those carboxylic acids which contain at least one aliphatic C—C-multiple bond, the generally termed aromatic multiple bonds being not included therein. A multiple bond bringing about the unsaturated character of the acids, for example a double bond, may thus be present in an aliphatic chain which carries the carboxyl group and which consists of at least three carbon atoms including the carboxyl carbon atom, as is the case for example with cinnamic acid.

The aromatic unsaturated acids used for the acylation may also contain the most various substituents for example in the aromatic nucleus, especially such substituents as exist generally in vat dyestuffs. As examples are named halogens, such as chlorine and bromine, hydrocarbon radicals, especially of aromatic nature, as well as acylamino groups. As acylating agents there come also into consideration, besides cinnamic acid, halogen cinnamic acids, such as ortho-, para- and meta-bromo-cinnamic acid, para-phenyl-cinnamic acid or para-benzoylaminocinnamic acid.

The present process can therefore be carried out in such a manner that a 4-amino-anthraquinone-2:1-(N)-benzacridone free from trifluormethyl groups or any substituents in the bz-nucleus is caused to react with a cinnamic acid halide. It is advantageous to work in an indifferent solvent, such as nitrobenzene or dichlorobenzene and by heating.

If the radical of the aromatic unsaturated acid used for the acylation is constituted in such a manner that it permits the introduction of further substituents, such substituents may be introduced into the dyestuff molecule also after the acylation according to the present invention has been effected. Examples of such substituents are especially acylamino groups. The reaction can be carried out for example in such a manner that there is used as acylating agent a nitro-substituted, aromatic unsaturated acid, such as para-nitrocinnamic acid, treating the resulting dyestuff with reducing agents and introducing the acylamino group into the radical of the cinnamic acid used by the action of further acylating agents.

The resulting dyestuffs can be further treated with agents introducing substituents, for example agents yielding halogen.

According to the present process there are obtained vat dyestuffs which can be used in known manner for dyeing and printing various materials, such as animal fibers and especially fibers containing cellulose. These dyestuffs can also be converted into the corresponding leuco ester salts and used in this form for dyeing and printing.

The following examples illustrate the invention, the parts being by weight:

*Example 1*

3 parts of 4-amino-anthraquinone-2:1-(N)-1':2'-(N)-benzacridone are heated for ½ hour to 140–150° C. with 5 parts of cinnamoyl chloride in 78 parts of ortho-dichlorobenzene. After cooling, the dyestuff crystallized in the form of fine blue-grey needles of the formula:

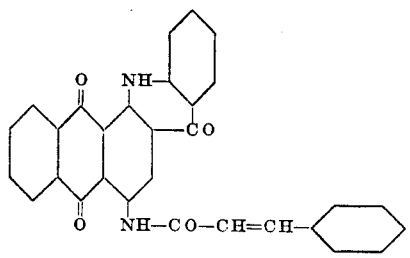

is filtered off, washed with alcohol and dried.

The dyestuff dissolves in concentrated sulfuric acid to a yellow-red solution and dyes cotton from a red-violet hydrosulfite vat bright greenish blue shades having excellent fastness properties.

A dyestuff having similar properties is also obtained by using 3 parts of 4-amino-anthraquinone-2:1-(N)-1':2'-(N)-benzacridone and 1.65 parts of cinnamoyl chloride.

*Example 2*

A mixture of 3 parts of meta-bromo cinnamic acid, 104 parts of ortho-dichlorobenzene (containing 2 drops of pyridine) and 8 parts of thionyl chloride are gradually heated to boiling in a reflux apparatus. As soon as the formation of the acid chlorides is complete and a clear solution has been formed, the thionyl chloride in excess is distilled with about 13 parts of solvent. 3 parts of 4-aminoanthraquinone-2:1-(N)-1':2'-(N)-benzacridone are added at 90° C. and the whole is heated for ½ hour to 140–150° C. The dyestuff of the formula:

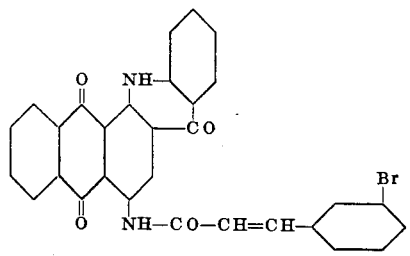

is filtered when cold, washed with alcohol and dried. It dissolves in concentrated sulfuric acid to a yellow red solution and dyes cotton from a red violet vat powerful blue shades possessing good fastness properties.

When using the equivalent quantity of ortho-chlorocinnamic acid instead of meta-bromo cinnamic acid there is obtained a dyestuff which dyes the vegetable fiber somewhat more reddish blue shades whereas with para-chloro-cinnamic acid or para-bromo-cinnamic acid dyestuffs are obtained which dye greenish blue shades.

*Example 3*

2.5 parts of para-phenyl-cinnamic acid are converted into the para-phenyl-cinnamic acid chloride as described in Example 2. 3 parts of 4-amino-anthraquinone-2:1-(N)-1':2'-(N)-benz-acridone are added to the cooled solution and the whole is heated for 1 hour to 140–150° C. The dyestuff of the formula:

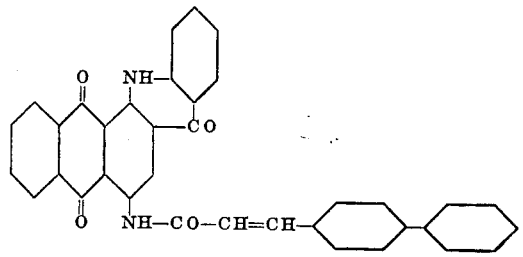

which crystallizes in grey-green needles dyes cotton from a red violet vat green blue shades, is obtained.

When condensing 4-[(para-amino)-cinnamoylamino]-anthraquinone-2:1-(N)-1':2'-(N)-benzacridone (obtained by condensation of 4-amino-anthraquinone-2:1-(N)-1':2'-(N)-benzacridone with para-nitrocinnamic acid chloride and reduction of the nitro compound in an alkaline hydrosulfite vat) with benzoyl-, para-chlorbenzoyl-, para-bromobenzoyl- or para-diphenylcarboxylic acid-chloride, there are obtained dyestuffs which dye the fiber greyish green-blue shades.

*Example 4*

2 parts of the dyestuff obtained according to Example 1 are made into a paste with 200 parts of water and 8 parts of caustic soda solution of 36° Bé., and vatted by addition of 4 parts of sodium hydrosulfite at about 50° C. This stock vat is added to a dye-bath consisting of 3000 parts of water, 7 parts of caustic soda solution of 36° Bé. and 3.5 parts of sodium hydrosulfite. 100 parts of cotton or viscose rayon are introduced at about 40° C., 60 parts of common salt are added after ¼ hour and dyeing is continued for 1 hour at 40–50° C. The material is squeezed out in the usual manner, oxidized and finished. Dyeing can also be effected at lower temperatures, for example at 25–30° C. The goods are dyed fast blue shades.

The dyestuff is also suitable for printing according to the usual potash printing process.

What we claim is:
The vat dyestuff of the formula:

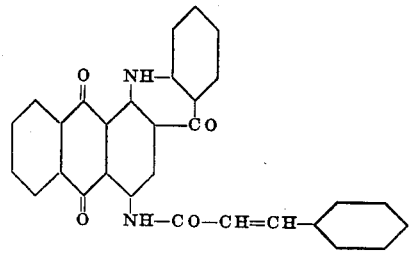

EDUARD MÖRGELI.
WALTER KERN.

REFERENCES CITED

The following references are of record in the file of this patent:

UNITED STATES PATENTS

| Number | Name | Date |
|---|---|---|
| 1,002,270 | Hessenland | Sept. 5, 1911 |
| 2,005,321 | Kunz | June 18, 1935 |
| 2,185,140 | Bauer | Dec. 26, 1939 |
| 2,204,232 | Schlichemmaier | June 11, 1940 |